United States Patent Office 3,711,461
Patented Jan. 16, 1973

3,711,461
MONOAZO DYESTUFFS CONTAINING AN ACE-TYLAMINO 2,4 - DIOXO - 1,2,3,4-TETRAHYDRO-QUINAZOLINE
Wolfgang Pretzer, Kelkheim, Taunus, and Joachim Ribka, Offenbach (Main), Germany, assignors to Farbwerke Hoechst Aktiengesellschaft vormals Meister Lucius & Bruning, Frankfurt am Main, Germany
No Drawing. Filed Nov. 3, 1970, Ser. No. 86,634
Claims priority, application Germany, Nov. 6, 1969, P 19 55 808.8
Int. Cl. C09b 29/36
U.S. Cl. 260—154
7 Claims

ABSTRACT OF THE DISCLOSURE

Water-insoluble monoazo dyestuffs of the general formula

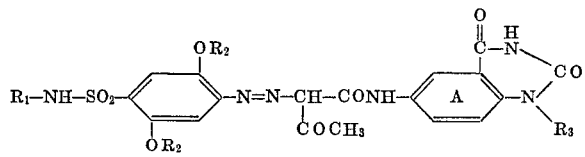

wherein $R_1$ is hydrogen, lower alkyl, aryl, aralkyl or cycloalkyl, which may be substituted by lower alkyl or halogen, $R_2$ is lower alkyl, $R_3$ is hydrogen or lower alkyl and A is a benzene nucleus substituted by lower alkyl, lower alkoxy on halogen.

Said pigments can be used, for example, for dyeing or printing plastics, caoutchouc, natural and synthetic resins textile fibrous materials or paper. Furthermore they can be employed for the preparation of printing inks, lacquers and dispersion paints. The novel pigments possess good to very good fastness properties.

---

The present invention relates to new valuable water-insoluble monoazo dyestuffs of the general formula

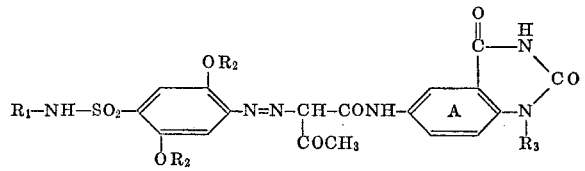

in which $R_1$ is hydrogen, alkyl having 1 to 4 carbon atoms, cycloalkyl which may be substituted, aryl or aralkyl, $R_2$ is alkyl having 1 to 4 carbon atoms and $R_3$ is hydrogen or alkyl having 1 to 4 carbon atoms, and A is a benzene nucleus which may be substituted by lower alkyl or alkoxy or halogen.

This invention, moreover, relates to a process for preparing these dyestuffs, which comprises coupling diazonium compounds of 1-amino-2,5-dialkoxybenzene-4-sulfonic acid amides of the general formula

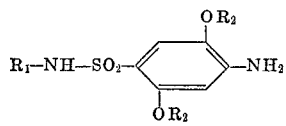

in which $R_1$, $R_2$ and $R_3$ are defined as above, with 6-acetoacetylamino - 2,4 - dioxo - 1,2,3,4 - tetrahydroquinazolines of the general formula

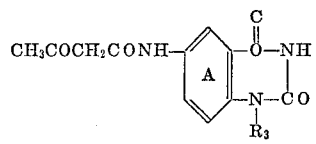

in which $R_1$, $R_2$, $R_3$ and A have the meaning given above.

The diazo components may be prepared by known methods, for example by reacting 1-acetamino-2,5-dialkoxy-benzene-4-sulfonic acid chlorides with amines of the general formula $R_1NH_2$ which are free from —$SO_3H$ and —COOH groups. $R_1NH_2$ may stand for ammonia, an aliphatic amine, such as methylamine, ethylamine, n-propylamine, i-propylamine, n-butylamine, i-butylamine, a cycloalkylamine which may be substituted by halogen or alkyl, for example cyclohexylamine, 2-methylcyclohexylamine, 2,4-dimethylcyclohexylamine, 2-chlorocyclohexylamine, 2-chloro-3-methylcyclohexylamine or an aryl or aralkylamine, preferably of the benzene or naphthalene series, which may be substituted by halogen, alkyl, phenyl, alkoxy, phenoxy, nitro, trifluoromethyl, alkylsulfonyl, arylsulfonyl or aralkylsulfonyl. Such aromatic amines may, for example, be aniline, chloro-anilines, such as 2-chloroaniline, 3-chloroaniline or 4-chloroaniline, dichloroanilines, such as 2,4-dichloroaniline or 2,5-dichloroaniline, trichloroanilines, such as 2,4,5-trichloroaniline or 2,4,6-trichloroaniline, mono- and dibromoanilines, such as 2-bromoaniline or 2,4-dibromoaniline, toluidines, such as 2-methylaniline, 3-methylaniline or 4-methylaniline, xylidines, such as 2,3-dimethylaniline, 2,4-dimethylaniline or 3,5-dimethylaniline, anisidines, such as 2-methoxyaniline, 3 - methoxy - aniline or 4 - methoxy - aniline, 2,5-dimethoxyaniline, 4-amino-diphenyl ether, nitro-anilines, such as 2-nitro-aniline, 3-nitro-aniline or 4-nitro-aniline, 2-trifluoro-methylaniline, 3,5-bis-trifluoromethylaniline, 4-aminophenyl - ethyl - sulfone, 4 - aminophenylsulfone, 1-amino-naphthalene, 2-amino-naphthalene as well as aromatic amines having different substituents, such as 5-chloro - 2 - methylaniline, 4 - chloro - 2 - methylaniline, 4-chloro - 2 - methoxyaniline, 5-chloro-2-methoxyaniline, 5-chloro-2,4-dimethoxyaniline, 4 - chloro-2,5-dimethoxyaniline, 4-methoxy-2-methylaniline, 5-methyl-4-chloro-2-methoxyaniline, 2-chloro - 4 - nitro-aniline, 4-chloro-2-nitroaniline, 5-nitro-2-methylaniline, 2-nitro-4-methylaniline, 4 - nitro - 2 - methoxyaniline, 2-nitro-4-methoxyaniline, 4-chloro-3-trifluoromethylaniline, 2 - amino-4-trifluoromethylphenyl-benzylsulfone, benzylamine, 4-nitrobenzylamine, 5-chloro-2-methoxy-benzylamine, 4-aminobenzonitrile and 4-amino-diphenyl. In this manner, 1-acetamino-2,5-dialkoxybenzene -4-sulfonic acid amides are obtained from which the desired diazo components 1-amino-2,5-dialkoxybenzene-4-sulfonic acid amides are prepared by saponification of the acetamino group.

The coupling components can also be prepared by known methods, for example, by reacting 2-chloro-5-nitrobenzoic acid with amines of the general formula $R_3NH_2$ at elevated temperature, optionally under pressure. Instead of 2-chloro-5-nitrobenzoic acid, the compound substituted by alkyl or alkoxy or further halogen atoms can be reacted in a corresponding manner with the amines $R_3NH_2$. Such amines $R_3NH_2$ may be ammonia or aliphatic amines, for example methylamine, ethylamine, n-propylamine, i-propylamine, n-butylamine, i-butylamine. The products obtained, i.e. 2-amino-5-nitrobenzoic acid or 2-alkylamino-5-nitro-benzoic acids, are reacted with alkali metal isocyanate or, at elevated temperature, with urea, whereupon ring closure takes place. The 6-nitro-2,4-dioxo-1,2,3,4-tetrahydroquinazolines or their n-alkylated analogs thus obtained, are converted into amino compounds with the aid of a suitable method, for example catalytic reduction, and then the desired acetoacetylamino compounds are prepared therefrom by means of suitable reactants, for example by reaction with diketene. It is also possible to start from anthranilic acid, or N-alkylated anthranilic acids, such as N-methyl-anthranilic acid, N-ethyl-anthranilic acid, N-i-propyl-anthranilic acid or N-i-butyl-anthranilic acid and to effect ring closure as disclosed above by reaction with alkali metal isocyanate or urea, then to nitrate and finally to convert the 6-nitro-2,4-dioxo-1,2,3,4-tetrahydroquinazolines thus obtained into the desired acetoacetylamino compounds in the manner specified above.

The coupling reaction can be carried out in known manner, especially in an aqueous medium, where required in the presence of non ionic, anion active or cation active dispersing agents.

To obtain an especially favorable crystal structure the coupling mixture is advantageously heated for some time, for example at boiling temperature or under pressure at temperatures above 100° C., where required in the presence of organic solvents, such as dichlorobenzene or dimethylformamide or resin soap. Especially pure and fast dyeings are obtained with the dyestuffs of the invention by after-treating the dyes, after coupling, in the form of moist filter cakes or dry powders with organic solvents, such as pyridine, dimethylformamide, alcohol, glycol, glycol-monomethyl ether, glacial acetic acid, chlorobenzene, dichlorobenzene, or nitrobenzene, at reflux temperature or under pressure at elevated temperature or by grinding them in the presence of grinding auxiliaries.

The dyestuffs may also be coupled in the presence of carrier substances which are suitable for the preparation of color lakes.

The new pigment dyestuffs are suitable for the preparation of printing inks, color lakes and dispersion paints, for coloring natural rubber, plastic material and natural or synthetic resins. They are, moreover, suitable for the pigment printing on substrates, especially textile fibre materials or other plane structures, for example paper. The dyestuffs may also be used for other purposes, for example in a finely divided form for the dyeing of rayon made from viscose or cellulose ethers or esters, polyamides, polyurethanes, polyglycol-terephthalates or polyacrylonitrile in the spinning solution, or for the coloration of paper.

The dyestuffs can advantageously be processed in the above media in which they show a high tinctorial strength and very pure shades. The dyeings are very fast to light, weather and migration and stable to the action of heat and chemical substances, especially solvents.

The following examples serve to illustrate the invention, the parts and percentages being by weight unless stated otherwise.

EXAMPLE 1

24.6 parts of 1-amino-2,5-dimethoxybenzene-4-sulfonic acid methylamide were stirred for about 1 hour with 40 parts by volume of 5 N hydrochloric acid and 60 parts by volume of water. The mixture was then diluted with 100 parts by volume of water and diazotized at 5° C. with 20 parts by volume of 5 N sodium nitrite solution. The solution was clarified with kieselguhr and the excess of nitrous acid, if any, was eliminated by means of amidosulfonic acid.

27.4 parts of 6-acetoacetylamino-2,4-dioxo-1,2,3,4-tetrahydroquinazoline were stirred at 20–25° C. with 200 parts by volume of water and the mixture was dissolved by adding 30 parts by volume of 10 N sodium hydroxide solution. After clarification with active carbon, the solution was diluted with 100 parts by volume of water, 20 parts by volume of a 10% aqueous solution of a reaction product of about 20 mols of ethylene oxide and 1 mol of stearyl alcohol were added and the coupling component was precipitated by adding 20 parts by volume of glacial acetic acid.

While maintaining the pH of about 5.5 constant, the diazonium salt solution was introduced while carefully stirring at about 20° C. into this solution of the coupling component. Coupling was rapidly complete. The coupling mixture was heated at the boil, suction-filtered hot, carefully washed with water andd ried at 65° C.

The yellow pigment obtained was powderized and heated for 2 hours to 85° C. with 400 parts by volume of dimethylformamide. The mixture was then suction-filtered, the dimethylformamide was washed off with methanol and water and the dyestuff was dried. A yellow pigment having a soft grain and a very pure shade was obtained. When incorporated in polyvinyl chloride, a lacquer, a printing ink or a dispersion paint, the dyestuff yields pure yellow dyeings having a high fastness to light, a very high fastness to overvarnishing and an unobjectionable fastness to bleeding in polyvinyl chloride and a very good resistance to heat.

When 6 - acetoaceylamino-2,4-dioxo-1,2,3,4-tetrahydroquinazoline was replaced by an equivalent amount of 7-methyl-6-acetoacetylamino-2,4-dioxo-1,2,3,4 - tetrahydroquinazoline or 8-chloro-6-acetoaceylamino-2,4-dioxo-1,2,3,4-tetrahydroquinazoline or 5-chloro-6-acetoacetylamino-2,4-dioxo-1,2,3,4-tetrahydroquinazoline, yellow dyestuffs having similar properties were obtained.

When 67 parts of polyvinyl chloride, 33 parts of a plasticizer mixture of equal parts of dioctylphthalate and dibutylphthalate, 2 parts of dibutyl-tin dilaurate, 0.5 part of titanium dioxide and 0.1 part of the above dyestuff are mixed for 15 minutes at 150° C. on a roller device and the mixture was processed into a sheet, the yellow coloration thereof is distinguished by a very good color intensity, an excellent fastness to heat and migration and a very good fastness to light.

EXAMPLE 2

35.8 parts of 1-amino-2,5-dimethoxybenzene-4-sulfonic acid β-naphthylamide were introduced into a mixture heated to 60° C. and consisting of 40 parts by volume of 5 N hydrochloric acid and 60 parts by volume of water. The mixture was diluted with 100 parts by volume of water and diazotized at 0–5° C. with 20 parts by volume of 5 N sodium nitrite solution. Subsequently, further 1500 parts by volume of water were added and the solution was clarified with kieselguhr. An excess of nitrous acid, if any, was eliminated by means of amidosulfonic acid.

This diazonium salt solution was introduced while carefully stirring at about 20° C. into a suspension of the coupling component in acetic acid, which was prepared as follows: 28.9 parts of 6-acetoacetylamino-1-methyl-2,4-dioxo-1,2,3,4-tetrahydroquinazoline were dissolved at 20–25° C., while stirring, in a mixture of 200 parts by volume of water and 30 parts by volume of 10 N sodium hydroxide solution. After clarification with active carbon, this solution was introduced, within about 30 minutes while carefully stirring, into solution of 300 parts by volume of water, 41 parts by volume of glacial acetic acid and 40 parts by volume of 10 N sodium hydroxide solution to which 20 parts by volume of a 35% aqueous solution of a reaction product of about 30 mols of ethylene oxide and 1 mol of oleyl alcohol had been added.

Coupling was complete very rapidly. The coupling mixture was heated at the boil, suction-filtered, carefully washed with water and dried at 65° C.

The yellow pigment thus obtained having a high tinctorial strength provides dyeings having the same very good fastness as those obtained with the dyestuff of Example 1.

When 6-acetoacetylamino-1-methyl-2,4-dioxo - 1,2,3,4-tetrahydroquinazoline was replaced by equivalent amounts of 7-ethoxy-6-acetoacetylamino-1-methyl-2,4-dioxo-1,2,3,4-tetrahydroquinazoline or 1,7-dimethyl-6-acetoacetylamino-2,4-dioxo - 1,2,3,4 - tetrahydroquinazoline, yellow dyestuffs were obtained having similar fastness properties.

When 0.8 part of the above pigment, 2.4 parts of alumina hydrate and 4.8 parts of a book-printing varnish are mixed on a three-roller device and ground, a book-printing ink having a pigment content of 10% is obtained which provides yellow prints of high purity and color intensity and a very good fastness to light.

EXAMPLE 3

23.2 parts of 1-amino-2,5-dimethoxybenzene-4-sulfonic acid amide were stirred for 15 minutes with 50 parts by volume of glacial acetic acid. The mixture was then diazotized at 20° C. with the equivalent amount of nitrosylsulfuric acid, stirring was continued for 30 minutes, the mixture was poured on 400 parts by volume of ice water, clarified with kieselguhr and excess nitrous acid, if any, was destroyed by means of amidosulfonic acid.

In the manner disclosed in Example 1, the suspension of the coupling component was prepared from 31.8 parts of 6-acetoacetylamino-1-n-propyl-2,4-dioxo-1,2,3,4 - tetrahydroquinazoline.

Coupling was also effected as disclosed in Example 1.

The dry dyestuff powder obtained was refluxed for 1.5 hours with 450 parts by volume of glacial acetic acid, the mixture was then suction-filtered, washed with methanol and water until the glacial acetic acid was eliminated, and dried at 65° C.

The pigment obtained provides yellow dyeings which practically correspond to the pigment dyeings produced according to Example 1 as regards their fastness properties.

EXAMPLE 4

26.0 parts of 1-amino-2,5-dimethoxybenzene-4-sulfonic acid ethylamide were diazotized as disclosed in Example 1.

The preparation of the suspension of the coupling component and coupling were carried out as disclosed in Example 2.

The filter cake of the dyestuff obtained after suction-filtration was heated for 6 hours to 125° C. in a pressure vessel with a mixture of 600 parts by volume of alcohol and 360 parts by volume of water. The mixture was then suction-filtered, carefully washed with water and dried at 65° C.

The dyeings produced with the yellow pigment thus obtained are practicaly identical with those produced in Example 1 as regards their fastness properties.

EXAMPLE 5

33.6 parts of 1-amino-2,5-diethoxybenzene-4-sulfonic acid anilide were diazotized as disclosed in Example 1.

The suspension of the coupling component was prepared according to Example 2. Coupling was also effected as disclosed in Example 2, but the mixture was not suction-filtered when coupling was complete. The coupling mixture was heated to 125° C. for 5 hours in a pressure vessel, then suction-filtered, carefully washed with water and dried at 65° C.

The dyestuff obtained yields yellow dyeings which practically have the same fastness properties as the pigment prepared according to Example 1.

The following table contains a number of further yellow pigment dyestuffs which can be prepared in a manner analogous to that disclosed in Examples 1 to 5:

| $R_1$ | $R_2$ | $R_3$ |
|---|---|---|
| H | $C_2H_5$ | H |
| H | $CH_3$ | $CH_3$ |
| $CH_3$ | $C_2H_5$ | H |
| $CH_3$ | $C_2H_5$ | $CH_3$ |
| $CH_3$ | $n$-$C_3H_7$ | $C_2H_5$ |
| $CH_3$ | $CH_3$ | $CH_3$ |
| $CH_3$ | $CH_3$ | $n$-$C_3H_7$ |
| $CH_3$ | $CH_3$ | $n$-$C_4H_9$ |
| $C_2H_5$ | $n$-$C_4H_9$ | $CH_3$ |
| $n$-$C_3H_7$ | $C_2H_5$ | $C_2H_5$ |
| $i$-$C_3H_7$ | $CH_3$ | $CH_3$ |
| –⟨H⟩– | $CH_3$ | H |
| –⟨H⟩– | $CH_3$ | $CH_3$ |
| $C_6H_5$ | $CH_3$ | H |
| $C_6H_5$ | $CH_3$ | $CH_3$ |
| $C_6H_5$ | $CH_3$ | $i$-$C_3H_7$ |
| $C_6H_5$ | $C_2H_5$ | $i$-$C_3H_7$ |
| $CH_2C_6H_5$ | $CH_3$ | H |
| $CH_2C_6H_5$ | $C_2H_5$ | $CH_3$ |
| –⟨$CH_3$⟩– | $CH_3$ | $CH_3$ |
| –⟨$CH_3$⟩–Cl | $n$-$C_3H_7$ | $n$-$C_3H_7$ |
| –⟨$CF_3$⟩($CF_3$)– | $C_2H_5$ | H |
| –⟨⟩–Cl | $CH_3$ | $CH_3$ |
| –⟨$NO_2$⟩– | $n$-$C_4H_9$ | $C_2H_5$ |
| –⟨$OCH_3$⟩–Cl | $C_2H_5$ | $n$-$C_3H_7$ |
| –⟨$NO_2$⟩–Cl | $CH_3$ | H |
| –⟨⟩–⟨⟩ | $n$-$C_3H_7$ | $n$-$C_3H_7$ |
| –⟨⟩–$SO_2$–⟨⟩ | $C_2H_5$ | $CH_3$ |
| –⟨H, $CH_3$⟩– | $CH_3$ | $CH_3$ |
| –⟨H, $CH_3$⟩–$CH_3$ | $C_2H_5$ | $n$-$C_3H_7$ |
| –⟨H⟩–Cl | $CH_3$ | H |
| –⟨H, Cl, $CH_3$⟩– | $n$-$C_4H_9$ | $CH_3$ |
| –⟨Cl, Cl, Cl⟩– | $CH_3$ | $CH_3$ |

TABLE—Continued

| R₁ | R₂ | R₃ |
|---|---|---|
| ![tolyl-dimethyl] —⟨⟩—CH₃ with CH₃ | n-C₃H₇ | H |
| —⟨⟩—OCH₃ | CH₃ | n-C₄H₉ |
| —⟨⟩—SO₂—C₂H₅ | C₂H₅ | H |
| —CH₂—⟨⟩ with Cl and OCH₃ | CH₃ | H |
| CF₃—⟨⟩—SO₂—CH₂—⟨⟩ | n-C₄H₉ | C₂H₅ |

We claim:

1. A dyestuff of the formula

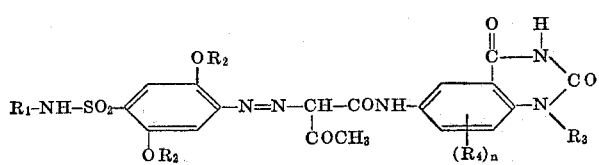

wherein R₁ is hydrogen, lower alkyl, phenyl, naphthyl, benzyl, diphenyl, phenoxyphenyl, phenyl-sulfo-phenyl, benzyl-sulfo-phenyl, cyclohexyl, or phenyl mono-, di- or tri-substituted by lower alkyl, lower alkoxy, trifluoromethyl, halogen, nitro, or a combination thereof, or cyclohexyl mono- or di-substituted by lower alkyl, halogen or a combination thereof, R₂ is lower alkyl, R₃ is hydrogen or lower alkyl, R₄ is hydrogen, lower alkyl, lower alkoxy or halogen and n is 1 or 2.

2. A dyestuff of the formula

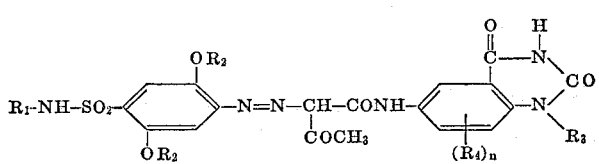

wherein R₁ is hydrogen, lower alkyl, phenyl, naphthyl, benzyl or cyclohexyl substituted by 1 to 3 members selected from the group consisting of chlorine, bromine and lower alkyl, R₂ is lower alkyl, R₃ is hydrogen or lower alkyl, R₄ is a hydrogen, chlorine, bromine, lower alkyl or lower alkoxy, and n is 1 or 2.

3. The dyestuff of the formula

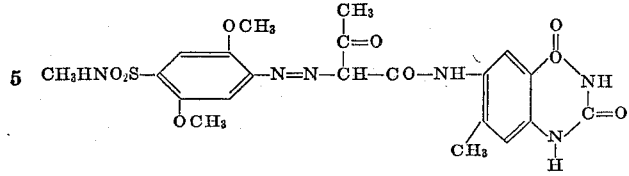

4. The dyestuff of the formula

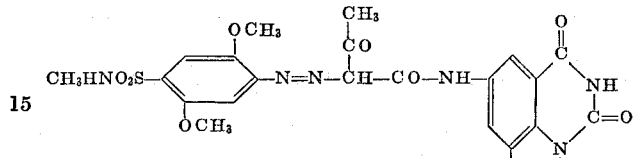

5. The dyestuff of the formula

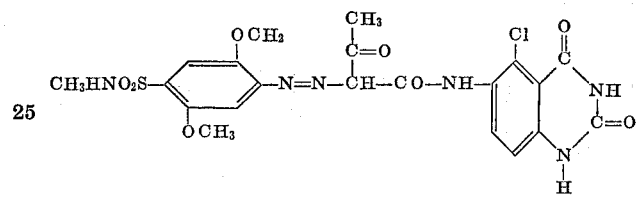

6. The dyestuff of the formula

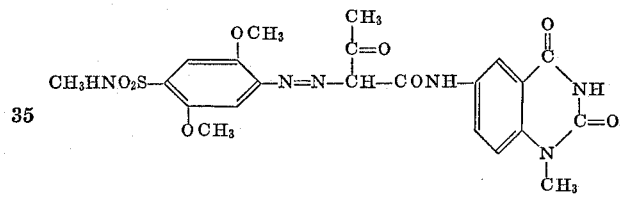

7. The dyestuff of the formula

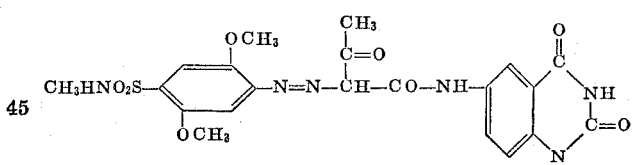

References Cited

UNITED STATES PATENTS 3,113,938  10/1963  Nakaten et al. _____ 260—204
3,118,870   1/1964  Dietz et al. _____ 260—154

LEWIS GOTTS, Primary Examiner

D. M. PAPUGA, Assistant Examiner

U.S. Cl. X.R.

260—208, 256.4